United States Patent
Hsieh et al.

(10) Patent No.: US 7,278,155 B2
(45) Date of Patent: Oct. 2, 2007

(54) SINGLE SIGN-ON SYSTEM FOR APPLICATION PROGRAM

(75) Inventors: Ching-Chuan Hsieh, Hsinchu (TW); Ji-Wei Lin, Hsinchu (TW); Chia San Lee, Taipei (TW); Yueh-Ching Lee, Taoyuan Hsien (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 740 days.

(21) Appl. No.: 10/062,484

(22) Filed: Feb. 5, 2002

(65) Prior Publication Data

US 2003/0079147 A1 Apr. 24, 2003

(30) Foreign Application Priority Data

Oct. 22, 2001 (TW) .............................. 90126025 A

(51) Int. Cl.
*G06F 7/04* (2006.01)
*H04K 1/00* (2006.01)
(52) U.S. Cl. ................ 726/8; 726/5; 713/186
(58) Field of Classification Search ................ 713/200, 713/202, 155, 183; 709/229, 227; 726/8
See application file for complete search history.

(56) References Cited

U.S. PATENT DOCUMENTS

| 5,944,824 A | * | 8/1999 | He ............................. 713/201 |
| 6,240,512 B1 | * | 5/2001 | Fang et al. ................. 713/155 |
| 6,275,944 B1 | * | 8/2001 | Kao et al. .................... 726/36 |
| 6,971,005 B1 | * | 11/2005 | Henry et al. ................... 726/6 |
| 2002/0078386 A1 | * | 6/2002 | Bones et al. ................ 713/202 |

* cited by examiner

*Primary Examiner*—Emmanuel L. Moise
*Assistant Examiner*—Courtney D. Fields
(74) *Attorney, Agent, or Firm*—Birch, Stewart, Kolasch & Birch, LLP

(57) ABSTRACT

The present invention discloses a single sign-on system for remotely operating an application program via a network. With the present invention, a user may operate a client computer, which connects and signs on to a single sign-on server to retrieve sign-on information. Then, the client computer connects and signs on to an application program server with the sign-on information, and updates the sign-on information saved in the single sign-on server by sending the sign-on information back to the single sign-on server.

16 Claims, 2 Drawing Sheets

SINGLE SIGN-ON SYSTEM FOR APPLICATION PROGRAM

BACKGROUND OF THE INVENTION

1. Field of the Invention

The present invention relates to a single sign-on system for an application program, and particularly to a single sign-on system with window-based interface applied in a network-based application program.

2. Description of the Related Art

In a company or an organization, a computer user may be required to use several application programs, such as e-mail or database management systems, which require authorization. Generally, these application programs are utilized or operated by the company employees via the network, such as the local area network (LAN). The employees may have various authorities to access the application programs; for example, a finance database management system may authorize employees of the accounting department to look up and modify the data, while no authorization is given to employees of other departments.

Generally, sign-on information such as accounts or passwords are involved for the authorized users (that is, the employees to operate the application programs). Thus, it is easier for the users to identify their authorities in the sign-on process of the application programs.

However, in order to establish confidence and security in authorization, the sign-on information should be kept secret, and it is preferred to use different sign-on information for different application programs. As a result, a user must keep all sign-on information for each application program firmly and clearly in mind. However, it is possible that the user may not complete the sign-on operation successfully, mixing up any part of the sign-on information or different sign-on information for different application programs; thus, being unable to operate the application program. In addition, if a user must use more than one application program, it is necessary to sign on to each application program with its respective sign-on information. This increases time and inconvenience of the sign-on operation.

SUMMARY OF THE INVENTION

In view of the aforementioned problem, the present invention discloses a single sign-on system and method thereof for an application program, which solves the problems incurred in the sign-on process while remotely operating the application program via a network. In the present invention, the user utilizes a pre-saved sign-on information in a single sign-on process to sign on to the application programs automatically. Further, the sign-on information is updated after signing on to the application programs successfully, so that the sign-on information is kept up-to-date.

The present invention discloses a single sign-on system to remotely operate an application program via a network. The single sign-on system comprises: an application program server for saving the application program; at least one client computer connected to the application program server via the network, each of the client computers receiving sign-on information, operating the application program by signing on to the application program server with the sign-on information, and sending the sign-on information after signing on to the application program server; and a single sign-on server connected to the client computer, the single sign-on server for receiving and saving the sign-on information from the client computer, and sending the sign-on information to the client computer when the client computer signs on to the application program server.

In the above-mentioned single sign-on system, the client computer may comprise an application program module for signing on to the application program server with the sign-on information and operating the application program; and a single sign-on module for receiving the sign-on information from the single sign-on server, sending the sign-on information to the application program module, and sending the sign-on information to the single sign-on server when the application program module signs on to the application program server.

Further, in the above-mentioned single sign-on system, the application program module may comprise a window-based interface; the sign-on information may comprise a sign-on password and a sign-on account; and the network may be a private network, a local area network (LAN) or a wide area network (WAN).

The present invention also discloses a method of a single sign-on process on a client computer for remotely operating an application program via a network, the method comprising the steps of: connecting and signing on to a single sign-on server to retrieve sign-on information from the single sign-on server; connecting and signing on to an application program server with the sign-on information; and updating the sign-on information by sending the sign-on information to the single sign-on server.

The aforementioned method may further comprise a step of: receiving new information, and signing on to the application program server with the new information as the sign-on information when failing to sign on to the application program server with the original sign-on information.

Further, in the aforementioned method, the client computer may comprise a window-based interface; the sign-on information may comprise a sign-on password and a sign-on account; and the network may be a private network, a local area network (LAN) or a wide area network (WAN).

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
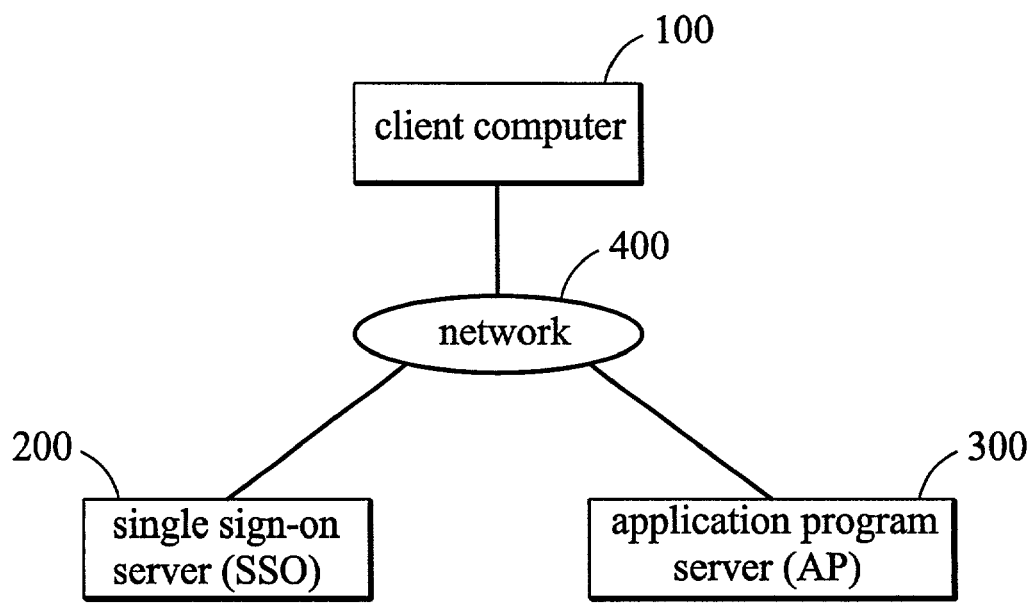
FIG. 1 is a block diagram of the application program single sign-on system of an embodiment of the present invention.

An embodiment of the single sign-on system of the present invention will be described hereinafter in detail in reference to FIG. 1 and FIG. 2.

The single sign-on system of the present invention is utilized to perform a sign-on process while remotely operating an application program via a network 400. In FIG. 1, numeral 100 denotes a client computer, numeral 200 denotes a single sign-on server (SSO), and numeral 300 denotes an application program server (AP). It should be noted that each element in FIG. 1 is shown in a single block for simplification of the drawing; however, the present invention is not limited to have only one client computer 100, one SSO 200, or one AP 300. That is, it is possible to involve more than one client computer 100, more than one SSO 200, or more than one AP 300 in realizing the present invention.

The AP 300 saves the application programs for users to remotely operate. In this operating process, the client computer 100 connects to the AP 300 to remotely operate the application programs via the network 400, and connects to the SSO 200 to access the sign-on information via the network 400.

Figure 2:
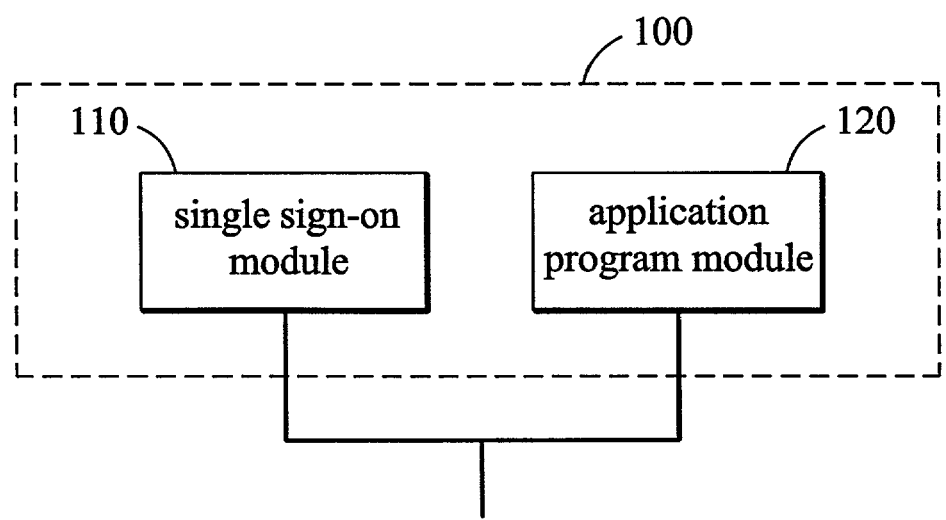
FIG. 2 is a block diagram of the client computer 100 of the embodiment in FIG. 1.

In the embodiment, the client computer 100 is configured as shown in FIG. 2, in which the client computer 100 has a single sign-on module 110 and an application program module 120. The application program module 120 is utilized to sign on to the AP 300 with the sign-on information, such as a sign-on account and a sign-on password, and operate the application program in the AP 300. The single sign-on module 110 is utilized to receive the sign-on information from the SSO 200, send the sign-on information to the application program module 120, and send the sign-on information back to the SSO 200 for updating when the application program module 110 successfully signs on to the AP 300.

In the embodiment, the application program module 120 has a user-friendly window-based interface for convenience of operation. Further, the sign-on information includes a sign-on account and a sign-on password; other information corresponding to the user identity may be included. Further, the network 400 in the present invention is, for example, a private network, a LAN or a WAN.

Figure 3:
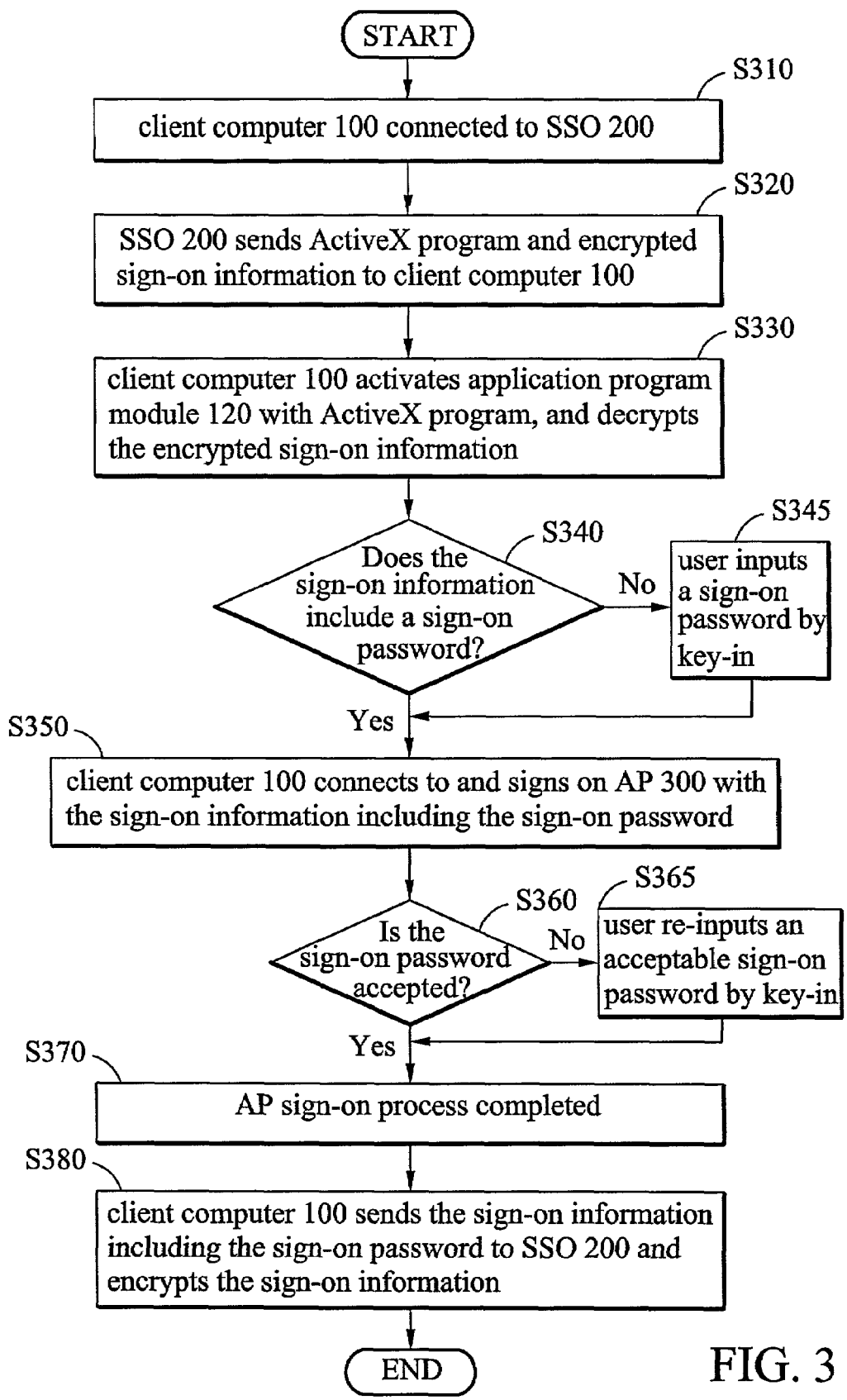
FIG. 3 is a flow chart showing the single sign-on method of the embodiment in FIG. 1.

In the following description, the method of a single sign-on process based on the construction of the aforementioned embodiment is hereinafter described in detail referring to FIG. 3.

When a user is about to remotely operate an application program saved in the AP 300 from the window-based interface of the client computer 100, the client computer 100 connects to and signs on to the SSO 200 via the network 400 (step S310). The SSO 200 checks the user identity provided in the signing step, and sends corresponding programs and information, such as a program generating the window-based interface and the sign-on information including a sign-on account and a sign-on password which is encrypted and saved in the SSO 200, to the client computer 100 (step S320). Then, the client computer 100 activates the application program module 120 with the interface-generating program, and decrypts the encrypted sign-on information (step S330).

It should be noted that, in this embodiment, although the sign-on information includes the sign-on account and the sign-on password, the sign-on information saved in the SSO 200 may be incomplete. As a result, a checking process is involved to make sure if the sign-on information includes a sign-on password (step S340). If the sign-on information is incomplete, the user may enter new information, such as a sign-on password (step S345), for the client computer 100 to sign on to the AP 300 successfully.

If the sign-on information is complete, or the user enters a sign-on password, the client computer 100 connects to and signs on to the AP 300 with the sign-on information (step 350). However, it is not guaranteed that the sign-on information saved in the SSO 200 or entered by the user will be accepted. For example, the sign-on password for the application program might be changed, but the sign-on password saved in the SSO 200 was not updated, and it is also possible for the user to mistype the password string while entering the sign-on password. As a result, a further checking process is involved to check if the sign-on password is accepted (step S360). If the sign-on password is incorrect or out-of-date, the user may re-enter a correct sign-on password as the new information (step S365). Then, the AP sign-on process is completed (step S370) when the client computer 100 successfully sign on to the AP 300, so that the user may operate the application program on the client computer. Finally, the client computer 100 sends the sign-on information with the accepted sign-on password back to the SSO 200 for encryption and updating (step S380), so that the sign-on information may be up-to-date for the next single sign-on procedure.

It should be noted that, in the present invention, the sign-on information is not limited to a sign-on account and sign-on password as described in the embodiment, and encryption and decryption in the client computer 100 and the SSO 200 are not necessary. That is, the sign-on information can be any information corresponding to the user identity, and may not be encrypted while saved in the SSO 200.

With the single sign-on system and method of the present invention, the user signs on to the application programs automatically, with a single sign-on process, to the single sign-on server, so that no respective entry of the sign-on information is required. If the user activates a new application program, the single sign-on process enables the user to enter new information to sign on to the new application, and sends the new information to the single sign-on server for saving. Accordingly, with the present invention, the user does not need to recite various sign-on passwords in mind, and the respective sign-on processes for all application programs is simplified, so that the operation time in the sign-on process is reduced, and the sign-on process is more convenient to the user.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A single sign-on system for a sign-on process to remotely operate an application program via a network, the single sign-on system comprising:

an application program server for saving the application program;

at least one client computer connected to the application program server via the network, the at least one client computer receiving sign-on information, operating the application program by signing on to the application program server with the sign-on information, and sending a new sign-on information after successfully signing on to the application program server; and a single sign-on server connected to the client computer, the single sign-on server receiving and saving the new sign-on information from the client computer, and sending the sign-on information to the client computer when the client computer signs on to the application program server.

2. The single sign-on system according to claim 1, wherein the client computer comprises:

an application program module for signing on to the application program server with the sign-on information and operating the application program; and a single sign-on module for receiving the sign-on information from the single sign-on server, sending the sign-on information to the application program module, and sending the new sign-on information to the single sign-on server computer when the application program module signs on to the application program server.

3. The single sign-on system according to claim 2, wherein the application program module further comprises a window-based interface.

4. The single sign-on system according to claim 1, wherein the new sign-on information comprises a sign-on password.

5. The single sign-on system according to claim 1, wherein the new sign-on information comprises a sign-on account.

6. The single sign-on system according to claim 1, wherein the network is a private network.

7. The single sign-on system according to claim 1, wherein the network is a local area network (LAN).

8. The single sign-on system according to claim 1, wherein the network is a wide area network (WAN).

9. A method of a single sign-on process on a client computer for remotely operating an application program via a network, the method comprising the steps of:

connecting and signing on to a single sign-on server to retrieve sign-on information from the single sign-on server;

connecting and signing on to an application program server with the sign-on information; and updating the sign-on information saved in the single sign-on server by sending a new sign-on information to the single sign-on server after successfully signing on to the application program server.

10. The method according to claim 9, further comprising a step of:

receiving new information, and signing on to the application program server with the new information as the sign-on information when failing to sign on to the application program server with the sign-on information.

11. The method according to claim 9, wherein the client computer further comprises a window-based interface.

12. The method according to claim 9, wherein the new sign-on information comprises a sign-on password.

13. The method according to claim 9, wherein the new sign-on information comprises a sign-on account.

14. The method according to claim 9, wherein the network is a private network.

15. The method according to claim 9, wherein the network is a local area network (LAN).

16. The method according to claim 9, wherein the network is a wide area network (WAN).

* * * * *